July 18, 1944.  E. C. NEAL  2,353,922
ROD AND CABLE CUTTER
Filed June 17, 1943  2 Sheets-Sheet 1
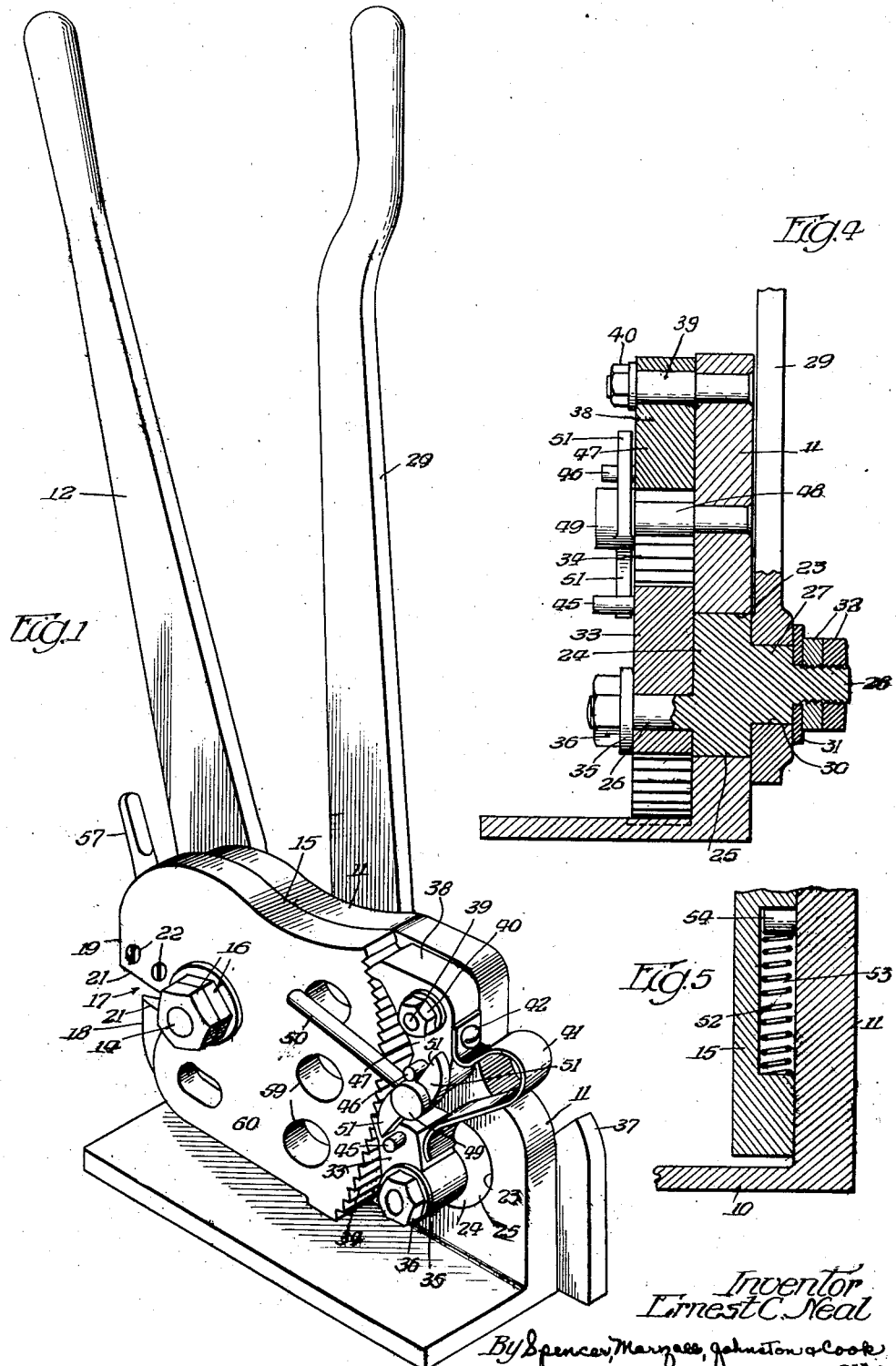

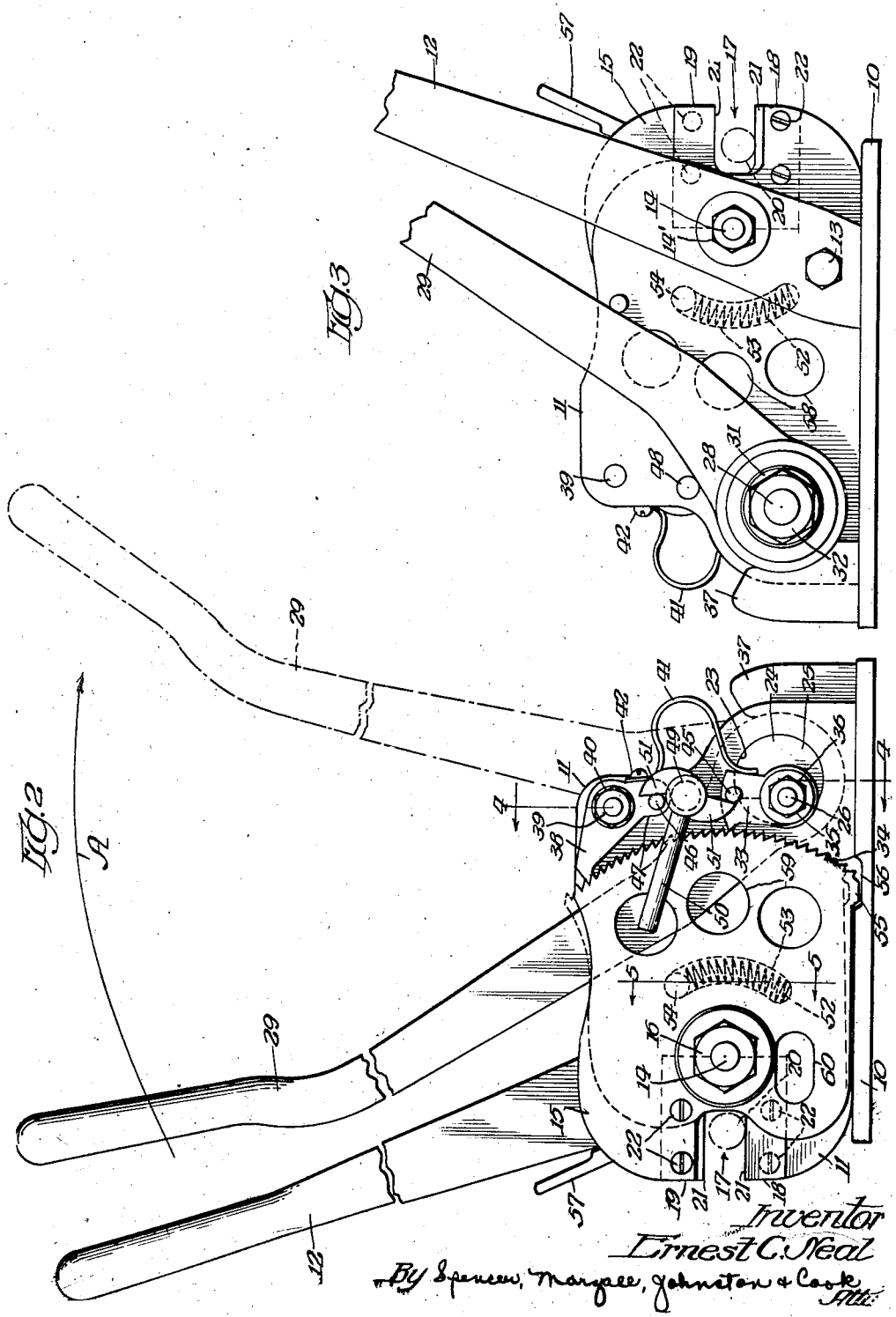

Patented July 18, 1944

2,353,922

UNITED STATES PATENT OFFICE 2,353,922

ROD AND CABLE CUTTER

Ernest C. Neal, Chicago, Ill.

Application June 17, 1943, Serial No. 491,179

17 Claims. (Cl. 164—44)

This invention relates to cutters for rods, cables and the like, and more particularly to a portable, hand-operated cutter.

A primary object of the invention is the provision of an improved rod, cable or like cutter which is light in weight, which can be readily carried from place to place for field or shop use, and which is capable of cutting through relatively large size stock without being attached to a fixed support.

A further object is the provision of a portable, hand-operated cutter that is compact in size, very handy to operate, and has increased utility over other known cutters.

A further object is the provision of a portable, hand-operated cutter having greatly increased shearing power with respect to size and weight of the cutter.

A further object is the provision of a portable, hand-operated cutter so arranged and constructed as to apply maximum manual power in a most convenient manner and without tending to turn or twist the cutter.

A still further object is the provision of a hand-operated, multi-stroke cutter for rods, cables and the like that is relatively light in weight, readily portable, simple and rugged in construction, powerful in operation, and easily and conveniently operated.

Another object is the provision of a multistroke cutter for rods, cables and the like that is rapidly and simply adjustable to start a cutting operation on stock of different sizes.

Another object is the provision of a multistroke cutter for rods, cables or the like in which the cutting jaws or blades are readily and simply released for return to an open position following a cutting operation and are automatically returned to such open position.

Still another object is the provision of a new and improved construction in multi-stroke cutters for rods, cables or the like, particularly of the portable and unfixedly attached type.

These and other objects will be apparent from the following description, the appended claims, and the accompanying drawings, which illustrate a selected embodiment of the invention, and in which:

Fig. 1 is a perspective view of a cutter constructed in accordance with the present invention;

Fig. 2 is a side elevational view of the cutter shown in Fig. 1;

Fig. 3 is an elevational view of the cutter taken from the opposite side thereof;

Fig. 4 is a sectional view taken on the line 4—4 of Fig. 2, and

Fig. 5 is a fragmentary detailed section taken on the line 5—5 of Fig. 2.

The cutter herein shown for the purpose of illustrating the invention comprises a base 10 adapted to be seated upon any suitable surface without attachment to the surface. A frame plate 11 extends upwardly from the base 10 and may be integrally attached thereto, as illustrated in Figs. 1, 4 and 5 of the drawings. A handle 12 is rigidly attached to one side of the upstanding frame plate 11 by suitable means such as a screw 13 and a pin 14 having a nut 14' threaded on one end thereof. The handle or lever 12 extends generally upwardly with respect to the plate 11 and base 10 and is adapted to be gripped in one hand of an operator during operation of the cutter.

A flat, plate-like member 15 is positioned against the other side of the frame plate 11 and is pivotally mounted on the frame plate by means of the pin 14 and nuts 16 threaded thereon. One end of each of the plates 11 and 15 is cut away as indicated at 17 to provide cooperating jaws 18 and 19 between which a rod, cable, bar or the like 20 is adapted to be received for cutting. Each of the jaws 18 and 19 carries a beveled cutter 21 which is inset into the jaws and demountably attached thereto by suitable means such as the screws 22. The cutters 21 are thus readily removable for sharpening or replacement by new cutters.

The end of the frame plate 11 remote from the cutting jaw 18 is provided with a circular opening 23 within which an eccentric member designated generally by the numeral 24 is journalled. The eccentric 24 comprises a circular disc portion 25 which is journalled in the opening 23 of frame plate 11, an eccentrically arranged pin 26 which extends from one side of the portion 25, and a squared boss 27 (Fig. 4) which extends from the other side of portion 25 and terminates in a threaded stud 28. A second hand-gripping lever or handle 29 has a squared opening 30 (Fig. 4) shaped to fit on the squared boss 27 and is retained in operative position on the boss by a washer 31 and lock nuts 32 threaded on the stud portion 28 of the eccentric.

A pawl 33 is pivotally mounted on the eccentric pin 26 and is adapted operatively to engage a plurality of ratchet teeth 34 provided on the end of plate 15 remote from the cutting jaw 19 and arranged on an arc concentric with the pivot 14 of the plate 15. The pawl 33 is operatively retained on the eccentric pin 26 by means of a washer 35 and a nut 36 which threads on a threaded extension of the pin 26. As illustrated, the cutting jaws 18 and 19 are arranged relatively close to pivot 13, whereas the ratchet teeth 34 are arranged on a relatively long radius whereby considerable leverage is obtained between the operating pawl 33 and the movable cutting jaw 19. This leverage is greatly compounded by means of the eccentric 24 and lever 29.

In accordance with the preferred embodiment of the invention, the arrangement of parts is such that both the lever or handle 12 and the lever or handle 29 extend upwardly with respect to the base 10 and frame plate 11, as illustrated in the drawings, and the lever 29 operates the eccentric 24 and pawl 33 to move the plate 15 and jaw 19 in a cutting direction by pulling the lever 29 away from the fixed lever or handle 12, as is illustrated by the arrow A and the solid and dashed lines in Fig. 2. By means of this arrangement a very great amount of manual force can be exerted on the levers or handles 12 and 29, and this force is applied in a most convenient manner and without any tendency of having the cutter turn or twist in the hands of the operator even though it is not fastened or attached to any rigid support. A stop 37 which may be integral with frame plate 11 limits movement of lever 29 away from lever 12 to prevent overturning of eccentric 24.

After each cutting stroke of the lever or handle 29 the movable plate 15 and cutting jaw 19 are held in operative cutting position by means of a retaining pawl 38 which is pivotally mounted on frame plate 11 by means of a stud 39 and nut 40 and is adapted to engage the ratchet teeth 34 and prevent movement of the plate and jaw towards open position. The pawl is free to slip past the ratchet teeth, however, upon a working or cutting movement of the plate 15 and jaw 19. In like manner the operating pawl 33 is free to slip over the ratchet teeth during return movement of lever 29 and eccentric 24.

The pawls 33 and 38 are normally maintained in engagement with the ratchet teeth 34 by a resilient means comprising a curved leaf spring 41 which is attached at one end to the pawl 38, as by means of screw 42, and has its opposite free end bearing against a portion of the pawl 33. The spring construction is such as normally to urge both pawls into engagement with the ratchet teeth but to permit either pawl to slip past the ratchet teeth in a predetermined direction.

To permit return of the plate 15 and jaw 19 to an open position following completion of a cutting operation, a means is provided for readily and simply releasing the pawls 33 and 38 from engagement with the ratchet teeth 34. A means is also provided for automatically returning the plate and jaw to open position upon release of the pawls.

Referring to the drawings, a pin 45 is attached to an upwardly extending portion of pawl 33 and a pin 46 is attached to a downwardly extending portion or leg 47 of pawl 38. A pin or stud 48 is mounted on the frame plate 11 intermediate the pawls 33 and 38 and rotatably carries a hub 49 of a pawl releasing lever 50. Also attached to the hub 49 are two operating levers or cams 51 which are arranged to engage the respective pins 45 and 46 and move the pawls 33 and 38 out of engagement with the ratchet teeth 34 upon manual movement of lever 50 in a predetermined direction, such direction being downward in the drawings. Thus upon downward movement of the lever 50 the ratchet teeth 34 are released from the pawls 33 and 38 and the plate 15 and jaw 19 are free to return to normal open position.

Following release of the ratchet pawls 33 and 38 a coiled spring 52 (Figs. 2, 3 and 5) provides for automatically returning plate 15 and jaw 19 to open position. The spring 52 is positioned within an arcuate recess 53 provided within the movable plate member 15 and is compressed between one end of the recess and a pin or lug 54 attached to the frame plate 11. The recess 53 is open on the side adjacent frame plate 11, as shown in Fig. 5, to permit relative movement of the pin or lug 54 along the length of the recess. The arrangement of parts is such that the spring and pin urge the plate 15 and jaw 19 towards open position. Opening movement of the plate 15 and jaw 19 under action of spring 52 is limited by engagement of a lug 55 carried by plate 15 (Fig. 2) with a recessed portion 56 of base 10.

A means is also provided for rapidly and simply moving the plate 15, jaw 19 and attached cutting blade 21 to a cutting position with respect to different size stock to be cut. This means comprises a lever or finger 57 which is rigidly attached to the movable plate 15 adjacent the forward or cutting end thereof. By depressing this lever, the plate 15 and jaw 19, together with cutter 21, are readily and rapidly moved into engagement with stock to be cut, the pawls 33 and 38 slipping over the ratchet teeth 34.

To obtain maximum stability in operation, the fixed lever or handle 12 is preferably so positioned that its longitudinal axis either passes through the pivot 14 of plate 15 or is positioned ahead of this pivot in the direction of the cutting jaws. In the illustrated embodiment, this axis passes through the pivot 14. The plates 11 and 15 may also be provided with a plurality of holes or open portions, such as 58, 59 and 60, to lighten the weight of the cutter.

A portable cutter is thus provided which is rugged in construction, simple in operation, and inexpensive to manufacture. By reason of the particular construction of the cutter, it is adapted for operation without being fixedly attached to any surface or support and is capable of cutting through relatively heavy rods, cable and the like in the absence of such fixed attachment or support. The arrangement of parts is also such that the cutter may be operated in a most convenient manner and with the greatest application of mechanical power. There is also no tendency of the cutter turning or twisting in the hands of the operator during operation of the same. The cutter may be constructed so light as readily to be carried by a single mechanic or workman and yet has cutting power equivalent to large size cutters which must be rigidly attached to a fixed support. This cutting power may be materially increased by arranging pipes or the like on the operating handles or levers to form extensions of the same. The push-pull operation on the hand levers provides for the exertion of maximum power without any tendency of the tool to twist or turn in the hands of the operator, as above described.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A portable, multi-stroke cutter of the character described for cutting metal rods, cables and the like comprising a member having a cutting jaw, a second member pivotally mounted on said first member and having a cutting jaw cooperating with said first jaw, a lever rigidly attached to said first member, a second lever pivotally mounted on said first member for movement towards and away from said rigid lever, and means for effecting step-by-step movement of said second member in a cutting direction in response to successive movements of said second lever in a direction away from said rigid lever whereby cutting is effected by pushing on one lever and pulling on the other.

2. A portable, multi-stroke cutter of the character described for cutting metal rods, cables and the like comprising a member having a cutting jaw, a second member pivotally mounted on said first member and having a cutting jaw cooperating with said first jaw, a hand-gripping lever rigidly attached to said first member and extending upwardly therefrom, a second hand-gripping lever pivotally mounted on said first member for movement towards and away from said rigid lever and extending upwardly from the first member, and means for effecting step-by-step movement of said second member in a cutting direction in response to successive movements of said second lever in a direction away from said rigid lever whereby cutting is effected by pushing on one lever and pulling on the other.

3. A portable, multi-stroke cutter of the character described for cutting metal rods, cables and the like comprising a member having a cutting jaw, a second member pivotally mounted on said first member and having a cutting jaw cooperating with said first jaw, a lever rigidly attached to said first member, an eccentric member rotatably mounted in said first member, a second lever attached to said eccentric member and movable towards and away from said rigid lever, and ratchet and pawl means operated by said eccentric member for effecting step-by-step movement of said second member in a cutting direction in response to successive movements of said second lever in a direction away from said rigid lever whereby cutting is effected by pushing on one lever and pulling on the other.

4. A portable, multi-stroke cutter of the character described for cutting metal rods, cables and the like comprising a base adapted to rest on any desired surface without attachment to the surface, a member extending upwardly from said base and having a cutting jaw at a forward end of the member, a second member pivotally mounted on said first member and having a cutting jaw cooperating with said first jaw, a plurality of ratchet teeth provided on said second member and arranged concentric with the pivotal axis of the said second member, a lever rigidly attached to said first member adjacent said forward end thereof and extending upwardly with respect to the said first member and base, a second upwardly extending lever pivotally mounted on said first member for movement towards and away from said rigid lever, means including a pawl engageable with said ratchet teeth for effecting step-by-step movement of said second member in a cutting direction in response to successive movements of said second lever in a direction away from said rigid lever whereby cutting is effected by pushing on one lever and pulling on the other, a second pawl engageable with said ratchet teeth to maintain the second member in operated position during return strokes of said second lever, and spring means normally urging said pawls into engagement with the ratchet teeth.

5. A portable, multi-stroke cutter of the character described for cutting metal rods, cables and the like comprising a base adapted to rest on any desired surface without attachment to the surface, a member extending upwardly from said base and having a cutting jaw at a forward end of the member, a second member pivotally mounted on said first member and having a cutting jaw cooperating with said first jaw, a plurality of ratchet teeth provided on said second member and arranged concentric with the pivotal axis of the said second member, a holding member connected to said first member adjacent said forward end thereof and extending upwardly with respect to the said first member and base, an upwardly extending lever pivotally mounted on said first member for movement towards and away from said holding member, means including a pawl engageable with said ratchet teeth for effecting step-by-step movement of said second member in a cutting direction in response to successive movements of said lever in a direction away from said holding member whereby cutting is effected by holding said holding member and pulling on the lever, a second pawl engageable with said ratchet teeth to maintain the second member in operated position during return strokes of said lever, spring means normally urging said pawls into engagement with the ratchet teeth, manually operable means for simultaneously releasing both of said pawls from engagement with said ratchet teeth to permit return movement of the second member, and spring means for automatically returning said second member to a predetermined position upon release of said pawls.

6. A portable, multi-stroke cutter of the character described for cutting metal rods, cables and the like comprising a base adapted to rest on any desired surface without attachment to the surface, a member extending upwardly from said base and having a cutting jaw at a forward end of the member, a second member pivotally mounted on said first member and having a cutting jaw cooperating with said first jaw, a plurality of ratchet teeth provided on said second member and arranged concentric with the pivotal axis of the said second member, a lever rigidly attached to said first member adjacent said forward end thereof and extending upwardly with respect to the said first member and base, a second upwardly extending lever pivotally mounted on said first member for movement towards and away from said rigid lever, means including a pawl engageable with said ratchet teeth for effecting step-by-step movement of said second member in a cutting direction in response to successive movements of said second lever in a direction away from said rigid lever whereby cutting is effected by pushing on one lever and pulling on the other, a second pawl engageable with said ratchet teeth to maintain the second member in operated position during return strokes of said second lever, spring means normally urging said pawls into engagement with the ratchet teeth, manually operable means for simultaneously releasing both of said pawls from engagement with said ratchet teeth to permit return movement of the second member, and spring means for automatically returning said second member to a predetermined position upon release of said pawls.

7. A portable, multi-stroke cutter of the character described for cutting metal rods, cables and the like comprising a member having a cutting jaw, a second member pivotally mounted on said first member and having a cutting jaw cooperating with said first jaw, a plurality of ratchet teeth provided on said second member and arranged concentric with the pivotal axis of the said second member, a lever rigidly attached to said first member, a second lever pivotally mounted on said first member for movement towards and away from said rigid lever, means including a pawl engageable with said ratchet teeth for effecting step-by-step movement of said second member in a cutting direction in response to successive movements of said second lever in a predetermined direction, a second pawl engageable with said ratchet teeth to maintain the second member in operated position during return strokes of said second lever, and spring means normally urging said pawls into engagement with the ratchet teeth, said spring means comprising a bowed leaf spring attached to one of said pawls at one end and having its opposite end operatively engaged with the other of said pawls.

8. A portable, multi-stroke cutter of the character described for cutting metal rods, cables and the like comprising a member having a cutting jaw, a second member pivotally mounted on said first member and having a cutting jaw cooperating with said first jaw, a plurality of ratchet teeth provided on said second member and arranged concentric with the pivotal axis of the said second member, a lever rigidly attached to said first member, a second lever pivotally mounted on said first member for movement towards and away from said rigid lever, means including a pawl engageable with said ratchet teeth for effecting step-by-step movement of said second member in a cutting direction in response to successive movements of said second lever in a predetermined direction, a second pawl engageable with said ratchet teeth to maintain the second member in operated position during return strokes of said second lever, spring means normally urging said pawls into engagement with the ratchet teeth, a manually operable lever pivotally mounted on said first member intermediate said two pawls, and means operated by said last named lever for engaging said pawls to release the pawls from engagement with said ratchet teeth and permit return movement of the second member.

9. A portable, multi-stroke cutter of the character described for cutting metal rods, cables and the like comprising a member having a cutting jaw, a second member pivotally mounted on said first member and having a cutting jaw cooperating with said first jaw, a plurality of ratchet teeth provided on said second member and arranged concentric with the pivotal axis of the said second member, a lever rigidly attached to said first member, a second lever pivotally mounted on said first member for movement towards and away from said rigid lever, means including a pawl engageable with said ratchet teeth for effecting step-by-step movement of said second member in a cutting direction in response to successive movements of said second lever in a predetermined direction, a second pawl engageable with said ratchet teeth to maintain the second member in operated position during return strokes of said second lever, spring means normally urging said pawls into engagement with the ratchet teeth, a manually operable lever pivotally mounted on said first member intermediate said two pawls, a pin attached to each of said pawls in a position to move the pawls out of engagement with said ratchet teeth, and a pair of oppositely directed cams operable by said last named lever to engage said pins and release said pawls from engagement with the ratchet teeth to permit return movement of said second member.

10. A portable, multi-stroke cutter of the character described for cutting metal rods, cables and the like comprising a member having a cutting jaw, a second member pivotally mounted on said first member and having a cutting jaw cooperating with said first jaw, a plurality of ratchet teeth provided on said second member and arranged concentric with the pivotal axis of the said second member, a lever rigidly attached to said first member, a second lever pivotally mounted on said first member for movement towards and away from said rigid lever, means including a pawl engageable with said ratchet teeth for effecting step-by-step movement of said second member in a cutting direction in response to successive movements of said second lever in a predetermined direction, a second pawl engageable with said ratchet teeth to maintain the second member in operated position during return strokes of said second lever, spring means normally urging said pawls into engagement with the ratchet teeth, a manually operable lever pivotally mounted on said first member intermediate said two pawls, a pin attached to each of said pawls in a position to move the pawls out of engagement with said ratchet teeth, a pair of oppositely directed cams operable by said last named lever to engage said pins and release said pawls from engagement with the ratchet teeth to permit return movement of said second member, and spring means for automatically returning said second member to a predetermined position upon release of said pawls.

11. A portable, multi-stroke cutter of the character described for cutting metal rods, cables and the like, comprising a base adapted to rest on any desired surface without attachment to the surface, a member extending upwardly from said base and having a cutting jaw at a forward end of the member, a second member pivotally mounted on said first member and having a cutting jaw co-operating with said first jaw, a plurality of concentrically arranged ratchet teeth provided on said second member, an upwardly extending lever rigidly attached to said first member adjacent said cutting jaws, an eccentric member having a circular disk-like portion journaled in said first member, a pawl operatively connected to said eccentric member for operation thereby to engage said ratchet teeth and move said second member in a cutting direction, and a second upwardly extending lever attached to said eccentric member for effecting step-by-step movement of said second member responsive to successive movements of said second lever towards and away from said first named rigidly mounted lever.

12. A portable, multi-stroke cutter of the character described for cutting metal rods, cables and the like, comprising a base adapted to rest on any desired surface without attachment to the surface, a member extending upwardly from said base and having a cutting jaw at a forward end of the member, a second member pivotally mounted on said first member and having a cutting jaw co-operating with said first jaw, a plurality of concentrically arranged ratchet teeth provided on said second member, an upwardly extending lever rigidly attached to said first member adjacent said cutting jaws, an eccentric member having a circular disk-like portion journaled in said first member, a pawl operatively connected to said eccentric member for operation thereby to engage said ratchet teeth and move said second member in a cutting direction, and a second upwardly extending lever attached to said eccentric member for effecting step-by-step movement of said second member responsive to successive movements of said second lever in a direction away from said first named rigid lever whereby cutting is effected by pushing on one lever and pulling on the other.

13. A portable, multi-stroke cutter of the character described for cutting metal rods, cables and the like, comprising a base adapted to rest on any desired surface without attachment to the surface, a frame plate member extending upwardly from said base and having a cutting jaw at a forward end of the member, a movable plate member mounted on said frame plate member and having a cutting jaw co-operating with said first jaw, a plurality of concentrically arranged ratchet teeth provided on said second plate member, one of said plate members being provided with an arcuate recess arranged concentrically with the pivotal axis of said members, the other of said plate members having a projection adapted to extend into said recess for relative movement along the length thereof, a coil spring positioned within said recess and compressed between one end of the recess and said projection, said spring means tending to move the movable plate member to a position in which said cutting jaws are open, lever means for operating said plate members in a cutting direction, a locking pawl for holding said members in operated position, and mechanically operated means for releasing said pawl to permit return of said second plate member under action of said coil spring.

14. A portable, multi-stroke cutter of the character described for cutting metal rods, cables and the like, comprising a base adapted to rest on any desired surface without attachment to the surface, a frame plate member extending upwardly from said base and having a cutting jaw at a forward end of the member, a movable plate member mounted on said frame plate member for rotation relative thereto about a pivotal axis disposed in angular spaced relation with the said jaw and having a cutting jaw co-operating with said first jaw, a plurality of concentrically arranged ratchet teeth provided on said second plate member, one of said plate members being provided with an arcuate recess arranged concentrically with the said pivotal axis, the other of said plate members having a projection adapted to extend into said recess for relative movement along the length thereof, a coil spring positioned within said recess and compressed between one end of the recess and said projection, said spring means tending to move the movable plate member to a position in which said cutting jaws are open, an eccentric member having a circular disk-like portion journaled in said frame plate member, pawl means operated by said eccentric member for engaging said ratchet teeth and effecting step-by-step movement of said second member in a cutting direction, an upwardly extending lever rigidly attached to said first member adjacent said cutting jaws, a second pivotally mounted lever for operating said eccentric and pawl by movement towards and away from said first named lever, and mechanically operated means for releasing said pawl means to permit return movement of said second member under action of said coil spring.

15. Shearing apparatus of the character described for cutting metal rods, cables and the like, comprising a pair of plate-like members pivotally connected together, co-operating cutting jaws on said plate-like members, a lever fixedly attached to one of said plate-like members adjacent said cutting jaws, a second lever pivotally mounted on said one plate-like member for movement towards and away from said first lever, and means operated by said second named lever for effecting a cutting movement of said cutting jaws in a cutting direction in response to movement of said second named lever with respect to said first named lever.

16. Shearing apparatus of the character described for cutting metal rods, cables and the like, comprising a pair of plate-like members pivotally connected together, co-operating cutting jaws on said plate-like members, a lever fixedly attached to one of said plate-like members adjacent said cutting jaws, a second lever pivotally mounted on said one plate-like member for movement towards and away from said first lever, means operated by said second named lever for effecting step-by-step movement of said cutting jaws in a cutting direction in response to successive movements of said second named lever away from said first named lever, a supporting base attached to one of said plate-like members, and said levers extending upwardly with respect to said supporting base.

17. Shearing apparatus of the character described for cutting metal rods, cables and the like, comprising a pair of plate-like members pivotally connected together, co-operating cutting jaws on said plate-like members, a lever fixedly attached to one of said plate-like members adjacent said cutting jaws, a second lever pivotally mounted on said one plate-like member for movement towards and away from said first lever, eccentric means operated by said second named lever for effecting step-by-step movement of said cutting jaws in a cutting direction in response to successive movements of said second named lever away from said first named lever, a supporting base attached to one of said plate-like members, and said levers extending upwardly with respect to said supporting base.

ERNEST C. NEAL.